(12) United States Patent  
Killian et al.

(10) Patent No.: US 8,208,606 B2
(45) Date of Patent: Jun. 26, 2012

(54) METHOD AND SYSTEM FOR VERIFYING THE STATUS OF 911 EMERGENCY TELEPHONE SERVICES

(75) Inventors: Thomas J. Killian, Westfield, NJ (US); Lorinda Cherry, Gillette, NJ (US); Norman Schryer, New Providence, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1189 days.

(21) Appl. No.: 12/004,293

(22) Filed: Dec. 20, 2007

(65) Prior Publication Data

US 2009/0161837 A1 Jun. 25, 2009

(51) Int. Cl.
*H04M 11/04* (2006.01)
(52) U.S. Cl. .......................................................... 379/51
(58) Field of Classification Search ..................... 379/51
See application file for complete search history.

(56) References Cited

U.S. PATENT DOCUMENTS 6,134,304 A * 10/2000 Norell ....................... 379/100.05
2008/0260110 A1* 10/2008 Chotai et al. .................... 379/45

* cited by examiner

*Primary Examiner* — Alexander Jamal

(57) ABSTRACT

A method and system allow a subscriber to test emergency 911 telephone services routed from the subscriber's location over a network to a response center. An alternative dialing code (*911) is provided for testing, and when a call placed by a subscriber to the alternative dialing code is received in the network, the network identifies the response center to which a 911 call placed from the subscriber's location is routed. An answering device is provided with status information with respect to the identified response center, and calls placed by the subscriber to the alternative dialing code are routed to the answering device, whereby when a subscriber places a call to the alternative dialing code, the answering device will supply the subscriber with status information with respect to the identified response center that receives a 911 call from the subscriber's location.

21 Claims, 6 Drawing Sheets

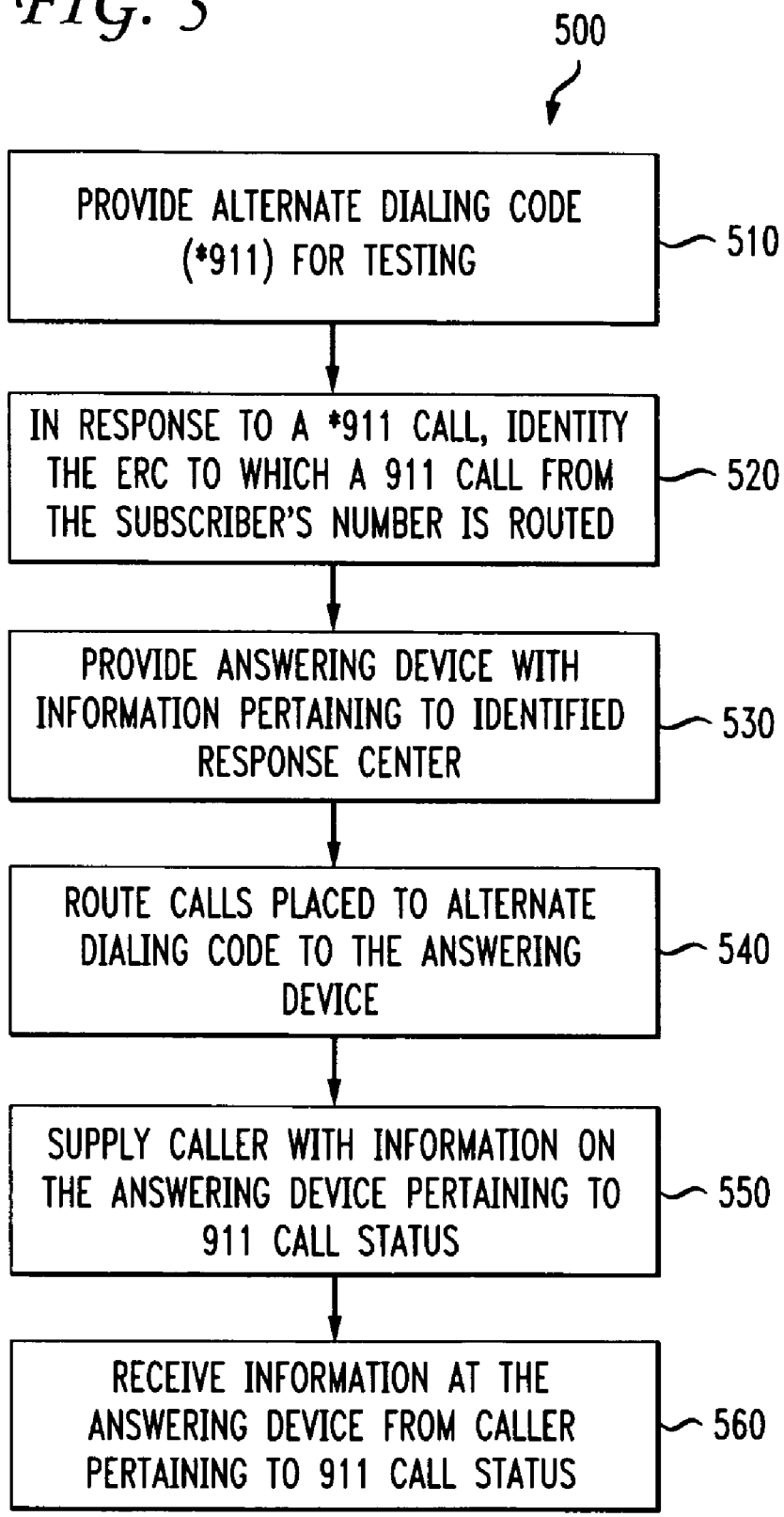

METHOD AND SYSTEM FOR VERIFYING THE STATUS OF 911 EMERGENCY TELEPHONE SERVICES

FIELD OF THE INVENTION

The present invention generally relates to the provision of 911 emergency telephone services, and more particularly to a system and method for ascertaining the status of such services.

BACKGROUND OF THE INVENTION

The 911 emergency service is a critical piece of infrastructure, which can provide much needed emergency police, firefighting or medical help to a caller able simply to dial the numerals "911". Ideally, a 911 service routes a call for help to a nearby response center which can dispatch help that will reach the caller in a timely fashion. Also ideally, the 911 emergency response center has accurate information about the subscriber's address associated with the caller's telephone number, so emergency assistance will be dispatched to the proper location. Finally, it is desirable that the 911 service center maintains certain useful information about residents at the subscriber's location, such as whether they are elderly or disabled or have medical conditions requiring special assistance in an emergency. (While the described emergency assistance services typically are known as "911" services, because of the way they are accessed, they may be accessed in other ways and be known by other names. For convenience, we refer to them herein as "911" services but mean this term to include other similar services.)

Ordinarily, a typical subscriber has no way to test that 911 service is working from a given telephone, or to verify that a given 911 call is routed to the correct emergency response center, since in most jurisdictions it is a misdemeanor to place a 911 call when no emergency exists.

Similarly, a typical subscriber has no way to find out whether the information, such as address information, that the 911 service associates with the subscriber's telephone number is accurate, because 911 information is generally gathered from third-party sources such as telephone-subscriber databases. Some response centers maintain data to identify the presence of elderly or disabled persons at an address. The vast majority of users who rely on 911 service have no way to verify or update their personal information (i.e., ensure that the system has their correct street address, city, and state, or personal information).

A number of recent developments complicate the provision of 911 services. Telephone number portability, which allows a customer to retain the customer's existing telephone number in a new location, makes routing of 911 calls problematic if call routing is based on associating an area or exchange code with a particular 911 response center location.

Likewise, the current practice of expanding the number of available telephone numbers by overlaying new area codes on old ones presents the same call routing difficulties.

Moreover, certain kinds of personal information that would be useful for an emergency responder to know, such as medical conditions, are subject to change with time and emergency response centers are ill-adapted to update such information without the assistance of the subscriber.

Also, the use of mobile telephones presents additional problems for assigning a call to an emergency response center. Typically, a mobile caller dialing 911 is connected to an emergency response center in the vicinity of the cell tower handling the call, but practices differ and a caller far from home may find his or her 911 call is set up to be answered by an emergency response center in another state. It would be useful for a mobile caller to know if this is the case.

Accordingly, there is a need to provide a method for enabling a telephone subscriber to verify the status of 911 services, the location of the emergency response center that is associated with the subscriber's number, and the accuracy of information associated with the subscriber or other residents at the location of the telephone linked to 911 service. There is a further need to provide communications systems arranged and configured to enable such a self-testing method to be employed.

BRIEF SUMMARY OF THE INVENTION

Briefly, the present invention is a method and system for allowing a telephone subscriber to verify 911 service parameters without either violating the law or occupying either available 911 communications capacity, or the time of responder personnel, that is needed for emergency response services.

The method includes providing a special alternative dialing code, such as the special dialing code "*911" (STAR 911). In a first exemplary embodiment, a *911 call is routed the same as a 911 call, but is picked up by an answering machine or interactive-voice-response (IVR) system at the response center. The caller hears an automated announcement detailing the center that was reached, which communities it serves, etc. An IVR system would allow the caller to alert the system to any perceived problem, such as a misrouted call. In a second embodiment, on a *911 call, the network computes the route that an actual 911 call would take, then forwards the call along with said routing information to an answering machine or IVR system in the network; said routing information is then used to provide the caller with the same services as in the first embodiment.

Subscribers thus can test their 911 service without committing a crime, and without pestering emergency service personnel. If a response center does not wish to implement *911 service itself, perhaps due to limited circuit capacity, this service can be provided in the network.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

FIG. 5 is a flowchart showing a method performed by a communications system according to the invention.

DETAILED DESCRIPTION OF THE INVENTION

Figure 1:
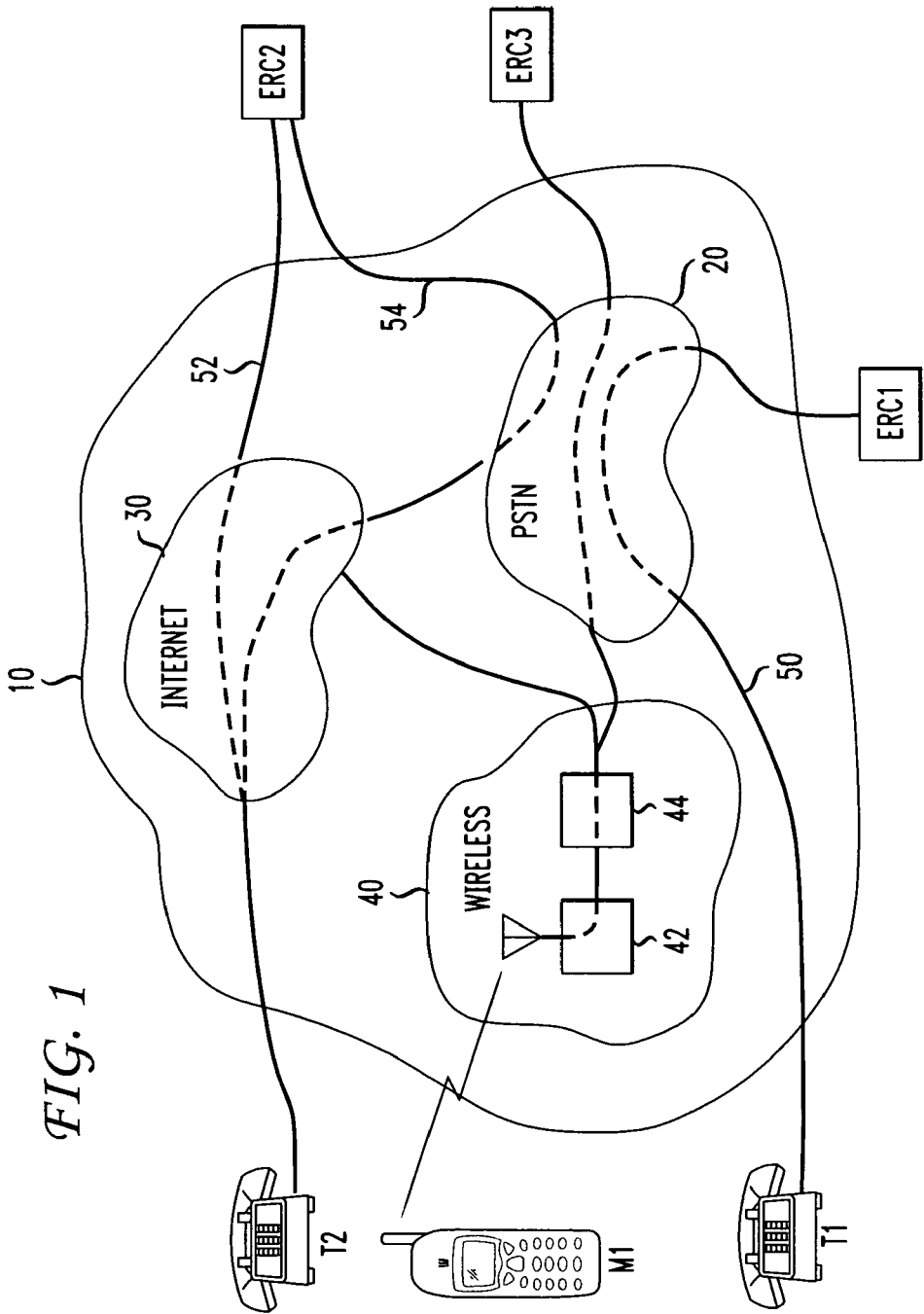
FIG. 1 shows elements of a telephone network arranged to provide 911 emergency services.

As shown in FIG. 1 subscriber telephones T1, T2 and M1 have 911 calls routed respectively to emergency response centers ERC1, ERC2 and ERC3 through a network 10, which may include the public switched telephone network (PSTN) 20, the Internet 30, and wireless network 40. As shown, a 911 call from subscriber telephone T1 is linked to response center ERC1 on a path 50 through the PSTN 20, which is how most 911 calls currently are routed. A 911 call from subscriber telephone T2, however, is shown linked to response center ERC2 through two alternative paths 52 and 54. The first path 52 illustrates an arrangement where both the subscriber telephone T2 and response center ERC2 are able to communicate wholly over connections to the Internet, using a service such as that provided by Skype, a company whose address is 22/24 Boulevard Royal, L-2449 Luxembourg. The second path 54 illustrates an arrangement where the subscriber telephone T2 uses a voice over Internet protocol service (VoIP) that completes calls over the PSTN 20 to destinations, which may include response center ERC2, which can only be accessed using ordinary telephone service.

Mobile subscriber telephone M1 is shown linked to response center ERC3 through a path 56 which includes a mobile cell tower 42 in the vicinity of mobile telephone M and communicating with mobile telephone M1 using appropriate cellular radio protocols such as GSM or CDMA. The cell tower 42 is connected to a mobile switching center 44, which in turn is connected both to the Internet 30 and PSTN 20. The path 56 is shown illustratively as passing through the PSTN 20, but could alternatively be handled completely in wireless network 40 by going through a second cell tower to a wireless telephone located at response center ERC3. Alternatively, the 911 call from mobile telephone M could be routed through Internet 30 to ERC3 if it were set up to receive Internet calls.

Figure 2:
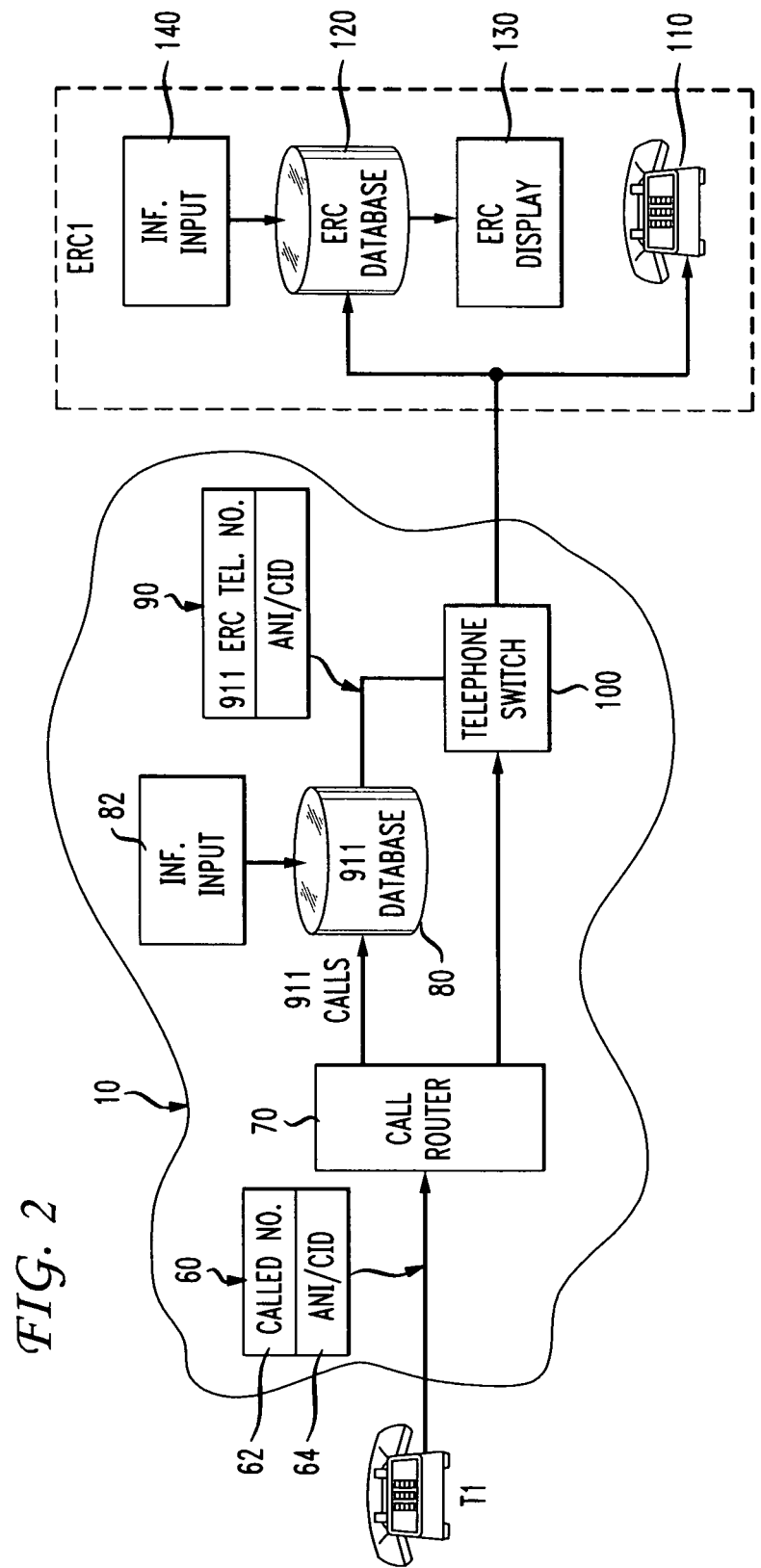
FIG. 2 is a diagram of an arrangement for routing 911 calls.

The manner in which 911 calls typically are routed from a subscriber telephone, such as T1, to an emergency response center, such as ERC1, is shown in FIG. 2. As shown in FIG. 2, a call placed by subscriber telephone T1 carries signaling or routing information 60 which, as is well known in the telephone arts, includes both the called number 62 (in this case, the number 911) and the calling number 64, i.e., the number used to access the subscriber's telephone. The calling number 64 is typically designated the "ANI" or automatic number identification that is used for a variety of purposes, such as billing or caller identification ("CID").

A call from subscriber telephone T1 is received in network 10 by a call router 70. The call router 70, which may be an element of an electronic switching device, or a software program performed by a processor in network 10, identifies 911 calls and routes them (or their signaling information 60) to a database 80. Database 80 has a conventional lookup table (not shown) that, for a 911 call from calling number 64 associated with subscriber telephone T1, identifies the particular response center, in this case response center ERC1, that is responsible for responding to 911 calls from subscriber telephone T1. Database 80 retrieves the communications address 90 (e.g., the destination telephone number) of the identified response center ERC1, couples it with the calling number 64, and sends the resulting signaling information 92 to telephone switch 100 to control the routing of the 911 call to the response center ERC1. As shown in FIG. 2, the database 80 has an information input device 82, such as a keyboard, memory card reader, or data uploader connected to a source of data, that permits information in the database 80 to be updated.

As shown in FIG. 2, response center ERC1 receives the 911 call routed by switch 100 at a telephone terminal 110, which allows emergency personnel to converse with the 911 caller, if possible, and to ascertain the nature of the emergency and any details that would assist the responders. Response center ERC1 also receives the 911 call at ERC database 120, which uses the calling number information 64 to look up the caller's information, such as the caller's street address, and any other information maintained by the response center pertaining to the subscriber or other residents at the subscriber's address, such as age, disability or medical condition. Such information may be retrieved and presented on a display 130, such as an LCD screen or paper printout, available to emergency personnel to consult while talking to the caller or to use in dispatching emergency assistance. An input device 140, which may be a keyboard, a memory card reader, or a data link to a source of data residing at a telephone company, for example, allows data in database 110 to be entered and updated. The ERC database 120, while shown at the location of ERC1, may alternatively be located in a network database, such as database 80, or on telephone company premises. For example, in the case of AT&T's CallVantage VoIP service, AT&T maintains this database in the network.

As previously indicated, the arrangement for providing 911 services that is illustrated in FIG. 2 does not allow the subscriber, without placing a 911 call to the response center, to easily ascertain whether the information that has been associated with the subscriber is accurate or up to date, or whether the response center responsible for responding to the subscriber's 911 call is even geographically located within a reasonable response distance from the subscriber's location and not several towns, or states, distant.

Figure 3:
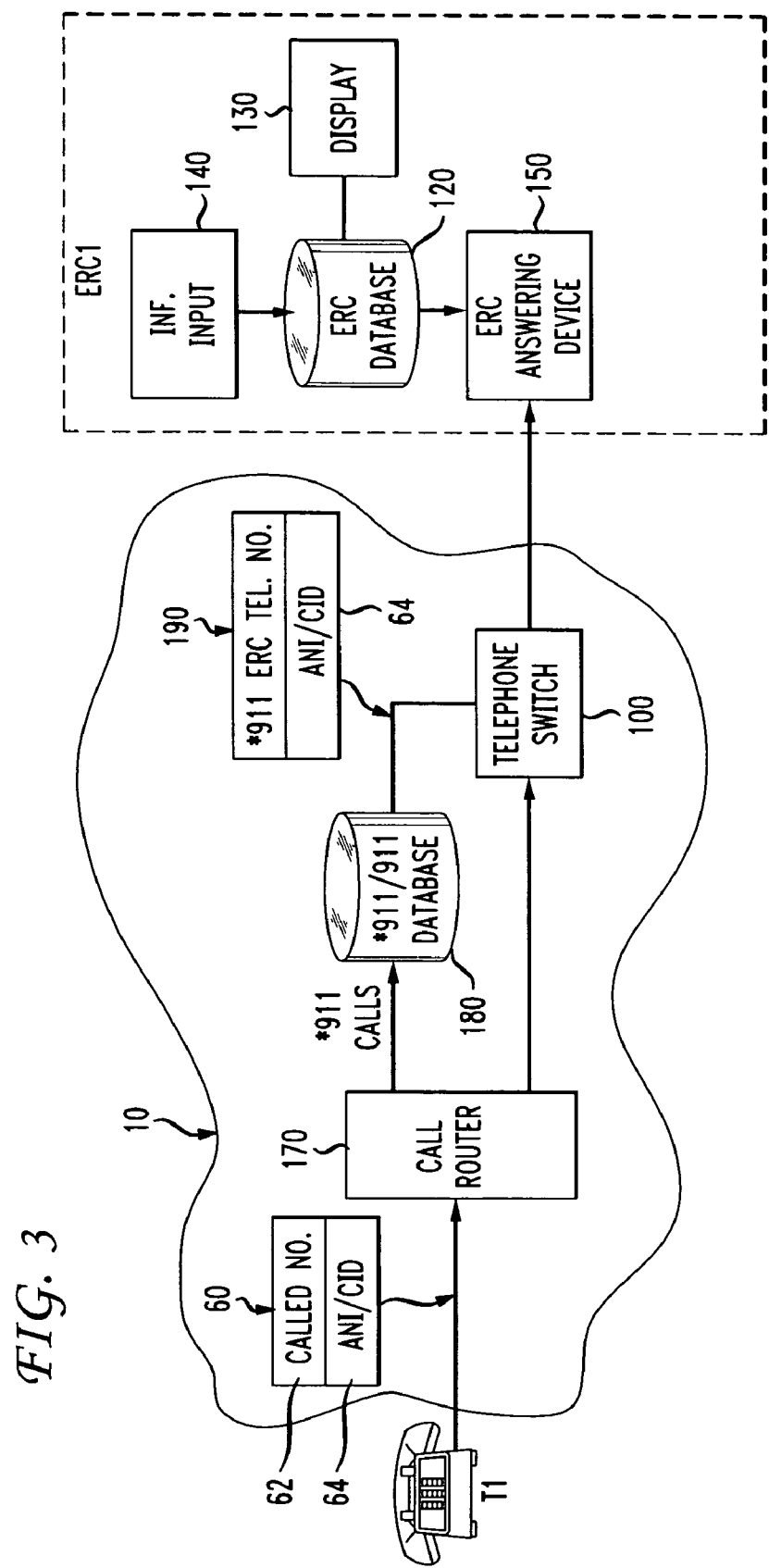
FIG. 3 is a diagram of a first embodiment of a system according to the invention.

In order to enable a subscriber to ascertain the status of the 911 information associated with the subscriber, the present invention utilizes an alternative dialing code, such as *911, and a system for processing calls made to such an alternative dialing code. FIG. 3 illustrates one embodiment of such a system.

As shown in FIG. 3, a call to the alternative dialing code *911 from terminal T1 is sent to a router 170, similar to the router 70 of FIG. 2, which identifies calls to the alternative dialing code *911 and routes them (or their signaling information 60) to a database 180. Database 180 has a conventional lookup table (not shown) that, for a *911 call from calling number 64 associated with subscriber telephone T1, identifies the particular response center, in this case response center ERC1, that is responsible for responding to 911 calls from subscriber telephone T1. Database 180, in the embodiment of the invention illustrated in FIG. 3, retrieves the communications address e.g., the destination telephone number 190, dedicated to an answering device 150 located in the identified response center ERC1, couples this destination number 190 with the calling number 64, and sends the resulting signaling information 192 to telephone switch 100 to control the routing of the *911 call to the answering device 150 in response center ERC1. As shown in FIG. 3, the *911 database 180 has an information input device 182 similar to input device 82 that permits information in the database to be updated.

As will be readily apparent to those of skill in the art, the *911 database 180 and the 911 database 80 may be elements of a single database which associates both the emergency response telephone number 90 (described with reference to FIG. 2) and the answering device telephone number 190 (described with reference to FIG. 3) with the calling number 64, and returns the emergency response telephone number 90 if the input is 911, and returns the answering device telephone number 190 if the input is *911.

The answering device 150 in response center ERC1 may be an answering machine which responds to all received calls with a common message that, for example, identifies the response center and the communities the response center serves. Such a message would permit a subscriber to know if the subscriber's 911 calls are being routed to an inappropriate response center. The answering machine may be configured to accept a message from the subscriber, for example, a message that would alert the response center to an inappropriate assignment.

Alternatively, the answering device 150 may be an interactive voice response (IVR) unit coupled to the ERC database 120. Such an IVR unit, in addition to supplying a message identifying the response center and the communities it serves, may use the received calling number 64 to retrieve subscriber-specific data from the database 120, such as the caller's street address or the subscriber's age or elderly status or disability or medical condition. Using standard IVR techniques, the subscriber can review the information maintained by the response center ERC1 and either affirm the information or leave correcting information for the response center to incorporate or follow up on.

The answering device 150 in response center ERC 1 operates independently of any emergency personnel, and thus its use does not interfere with the provision of emergency services. If accessed through a separate telephone line, emergency communications with the center are similarly unaffected. Accordingly, a subscriber is enabled to ascertain the status of the subscriber's 911 information without committing a misdemeanor or pestering emergency personnel.

Figure 3A:
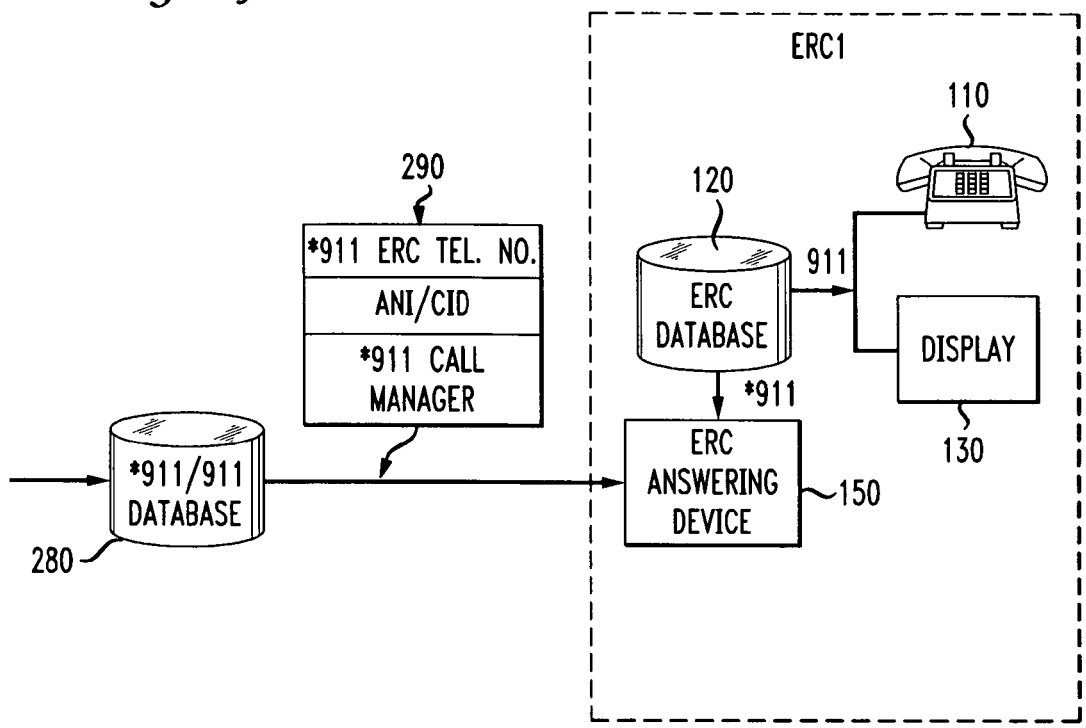
FIG. 3A is a diagram of an alternative routing arrangement for the first embodiment of the invention.

FIG. 3A illustrates a modification of the system of FIG. 3. As shown in FIG. 3A, the *911 call is routed to a database 280 which looks up the emergency response 911 telephone number 90 of the response center associated with calling number 64. Database 280, in the embodiment of the invention illustrated in FIG. 3A, couples this destination number 90 with the calling number 64, but adds a bit identifier 284 to signify or mark that the call is a *911 call, and sends the resulting signaling information 292 to telephone switch 100 to control the routing of the call to the response center ERC1. The call is received by the ERC database 120, which in this case is arranged to test for the *911 call marker 284, and if the marker 284 is present the call is routed to the ERC answering device 150. If the marker is not present, the call is a standard 911 call and is routed to terminal 110 and display 130.

Figure 4:
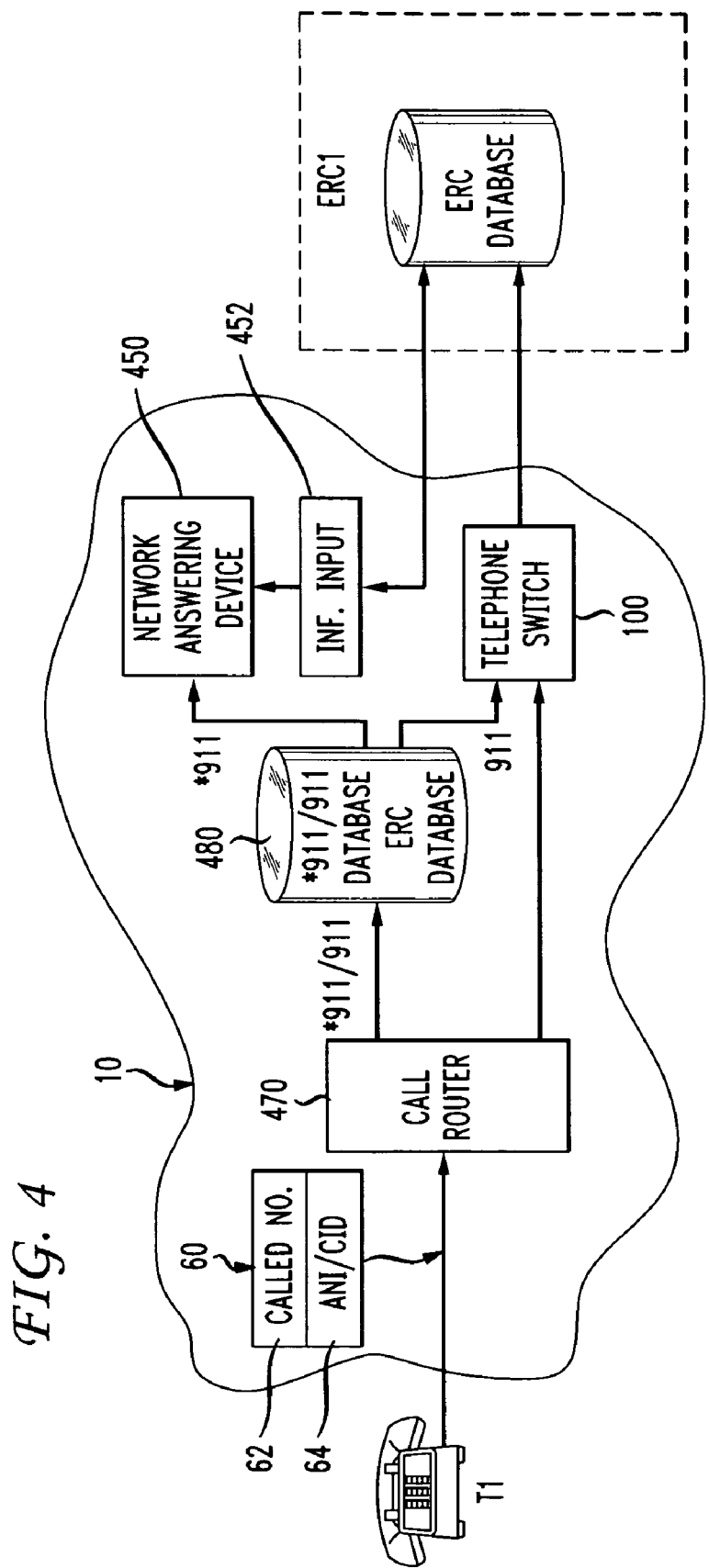
FIG. 4 is a diagram of a second embodiment of a system according to the invention.

FIG. 4 illustrates another embodiment of the invention, in which an answering device 450 that responds to a *911 call is located not in the response center ERC1, but in the network 10. The arrangement of FIG. 4 is useful, for example, if communities providing emergency response centers decline to invest in the self-testing arrangements of FIG. 3 or 3A.

As shown in FIG. 4, *911 calls from subscriber telephone T1 are routed by router 470 to database 480. In response to receipt of a *911 call, database 480 looks up the emergency call number 90 of the response center ERC1 that is associated with calling number 64 of telephone T1. In addition, database 480 contains a lookup table in which the inputs are the emergency call numbers 90 of all of the response centers served by the database 480, and in which the outputs are status information relating to those response centers, such as the identity of the response center, its address, and the communities it serves. When a *911 call is received, this status information is provided to answering device 450 and then is supplied by the answering device as a message to the subscriber placing the *911 call.

The network answering device 450 may be an answering machine, arranged to deliver limited information such as the identification of the response center and the communities it serves. Alternatively, the answering device may be an IVR, arranged to supply additional information. As shown in FIG. 4, the answering device 450 may be connected through an information input device 452 to the response center database 120, where the response center maintains data that pertain to the subscriber. Using information input device 452, the network may use the subscriber's calling number to access such subscriber-specific data and provide it to the answering device 450 to supply information to the subscriber about the data maintained at the response center. The answering device may be supplied with such data on an as-demanded basis or periodically. Alternatively, the data may be supplied to and maintained in network database 480 and then forwarded to answering device 450. Through known IVR techniques, the subscriber may review the information and affirm it or supply correcting information. The correcting information may be returned to the response center to be incorporated in the center's database or followed up in another fashion.

As will be apparent to those of skill in the art, the network answering device 450 may be used either as the exclusive means for supplying 911 status information to a subscriber, or it may be used as a backup or default in instances where a response center has not supplied its own answering device 150. In the latter instance, the network database 480 may be arranged to maintain a record of whether a response center has a local answering device 150, and if so, to route the *911 inquiry to the answering device 150 using the technique of FIG. 3 or FIG. 3A, and if not, to route the *911 query to the network answering device 450.

FIG. 5 is a flowchart showing a method 500 according to the invention. In step 510, an alternative dialing code, such as *911, is provided for accessing 911 status information.

In step 520, in response to a receipt of a *911 call, the method identifies the response center to which a 911 call from the subscriber's calling number is routed. The identification of the response center may be made by accessing a look up table in a database, such as database 80, 180, 280 or 480.

In step 530, an answering device, such as answering device 150 or 450 is provided with information pertaining to 911 call status for the identified response center, such as the identity of the response center receiving the call and the communities it serves. The answering device may be positioned at the response center (answering device 150) or in the network (answering device 450). The information provided to the answering device may be provided by recording an answering machine message, or by accessing a database, such as network database 480 or response center database 150 or both.

In step 540, calls placed to the alternative dialing code (*911) are routed to the answering device. If the answering device is in the response center, the call may be routed to a telephone number dedicated to the answering device (FIG. 3) or may be routed to the response center emergency number with a marker to indicate that the call is a *911 call and the response center is to route the call to the answering device (FIG. 3A). If the answering device is in the network, the call is connected by the network to the answering device 450. The call may be routed to the response center or to the network depending on whether the response center has a local answering device.

In step 550, the caller making the *911 inquiry is supplied with the information provided to the answering device pertaining to 911 call status. If the answering device is an answering machine, the 911 status information may be the identity of the call center and the communities it serves. If the answering device is an IVR unit, the 911 status information may be subscriber-specific information such as the subscriber's address, or the age or status as elderly, or the disability or medical condition of the subscriber or another resident at the subscriber's address.

In step 560, where appropriate and allowed by the answering device configuration, the answering device receives information from the caller making the *911 inquiry that, as noted above, may affirm or correct the status information the caller has been supplied.

Thus, the invention describes a feature enabling a subscriber to ascertain the status of 911 service and, if appropriate, to provide information to correct any mistakes in the 911 emergency service associated with the subscriber's number. The improved feature includes both system and method aspects. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A method for a subscriber to test information used by a response center to supply emergency response services to the subscriber in response to an emergency response call placed by the subscriber, comprising:
    providing an alternative dialing code that is available to the subscriber to place a test call;
    receiving, in the network, the test call placed by the subscriber with the alternative dialing code;
    using the test call placed with the alternative dialing code to identify, in the network, the response center to which the network routes the emergency response call placed by the subscriber;
    providing an answering device with status information with respect to the response center; and
    routing the test call placed by the subscriber with the alternative dialing code to the answering device, wherein when the subscriber places the test call with the alternative dialing code, the answering device supplies the subscriber with the status information with respect to the response center to which the network routes the emergency response call placed by the subscriber.

2. The method claimed in claim 1 wherein the answering device is located at the response center, and routing the test call to the answering device comprises maintaining, at the response center, a telephone number for access to the answering device, and routing the test call to the telephone number for access to the answering device.

3. The method claimed in claim 1 wherein the answering device is located at the response center, and routing the test call to the answering device comprises maintaining, at the response center, an emergency response telephone number for access to the emergency response services, routing the test call to the emergency response telephone number, identifying, at the response center, the test call routed to the emergency response telephone number as a test call placed with the alternative dialing code, and directing the test call at the response center to the answering device.

4. The method claimed in claim 1 wherein the answering device is located in the network.

5. The method claimed in claim 4 wherein a database maintains data that pertain to the subscriber, and further comprising accessing the data and providing the data to the answering device to supply the status information to the subscriber.

6. The method claimed in claim 1 wherein the answering device is an answering machine with a recorded message that supplies the status information, and wherein the status information comprises at least one of the response center's location and the communities served by the response center.

7. The method claimed in claim 6 further comprising receiving messages from the subscriber in the answering device.

8. The method claimed in claim 1 wherein the answering device is an interactive voice response unit storing the status information, and wherein the interactive voice response unit allows the subscriber to access the status information.

9. The method claimed in claim 8 further comprising receiving a messages from the subscriber in the interactive voice response unit.

10. The method claimed in claim 8 wherein the status information comprises at least one of a subscriber's address, a subscriber's disability, a subscriber's medical condition, and a subscriber's age.

11. A system enabling a subscriber to test information used by a response center to supply emergency response services to the subscriber in response to an emergency response call placed by the subscriber, comprising:
    means for receiving, in the network, a test call placed by a subscriber with an alternative dialing code available to the subscriber to place the test call;
    means for using the test call placed with the alternative dialing code to identify, in the network, the response center to which the network routes the emergency response call placed by the subscriber;
    an answering device with status information with respect to the response center; and
    means for routing the test call placed by the subscriber with the alternative dialing code to the answering device, wherein when the subscriber places the test call with the alternative dialing code, the answering device supplies the subscriber with the status information with respect to the response center to which the network routes the emergency response call placed by the subscriber.

12. The system claimed in claim 11 wherein the answering device is located at the response center, the response center maintains a telephone number for access to the answering device, and wherein the means for routing the test call to the answering device routes the test call to the telephone number for access to the answering device.

13. The system claimed in claim 11 wherein the answering device is located at the response center, the response center maintains an emergency response telephone number for access to the emergency response services, and wherein the means for routing the test call to the answering device routes the test call to the emergency response telephone number, identifies the test call routed to the emergency response telephone number as a test call placed with the alternative dialing code, and directs the test call at the response center to the answering device.

14. The system claimed in claim 11 wherein the answering device is located in the network.

15. The system claimed in claim 11 further comprising a database that maintains data that pertain to the subscriber, means for providing the data to the answering device, and wherein the status information comprises the data.

16. The system claimed in claim 15 wherein the database is located in the network, and wherein the answering device is located in the network.

17. The system claimed in claim 11 wherein the answering device is an answering machine with a recorded message that supplies the status information, and wherein the status information comprises at least one of the response center's location and the communities served by the response center.

18. The system claimed in claim 17 wherein the answering machine has means for receiving messages from the subscriber.

19. The system claimed in claim 11 wherein the answering device is an interactive voice response unit storing the status information, and wherein the interactive voice response unit has means for allowing the subscriber to access the status information.

20. The system claimed in claim 19 wherein the interactive voice response unit further comprises means for receiving messages from the subscriber.

21. The system claimed in claim 19 wherein the status information comprises at least one of a subscriber's address, a subscriber's disability, a subscriber's medical condition, and a subscriber's age.

* * * * *